United States Patent [19]
Ackermann

[11] 3,886,270

[45] May 27, 1975

[54] INTRAVENOUSLY TOLERATED ANTI-DISTEMPER AND ANTI-HEPATITIS VACCINE, ITS PREPARATION AND ITS USE FOR IMMUNIZATION

[75] Inventor: Othmar Ackermann, Marbach near Marburg, Lahn, Germany

[73] Assignee: Behringwerke Aktiengesellschaft, Marburg, Lahn, Germany

[22] Filed: May 24, 1973

[21] Appl. No.: 363,413

[30] Foreign Application Priority Data
May 26, 1972 Germany............................ 2225548

[52] U.S. Cl.................................... 424/89; 195/1.5
[51] Int. Cl. ......................... C12k 5/00; C12k 7/00
[58] Field of Search ....................................... 424/89

[56] References Cited
UNITED STATES PATENTS

| | | | |
|---|---|---|---|
| 3,316,153 | 4/1967 | Van Frank........................... | 195/1.5 |
| 3,470,294 | 9/1969 | Drager et al.......................... | 424/89 |
| 3,519,400 | 7/1970 | Anderson.............................. | 195/1.5 |

OTHER PUBLICATIONS

Elliott et al. Appl. Microbiol. 20: 667–671 (1970), "Continuous–Flow Ultracentrifugation of Canine Distemper Virus and Infectious Canine Hepatitis Virus."
Ackermann, J.A.V.M.A. 156: 1755–1758 (1970), "Early Immunization Against Canine Distemper and Hepatitis Using Combined Vaccines."
Gass et al., Kleintier–Prax 14: 130–132, 136–137 (1969), "Prophylaxis of Distemper by Intravenous Injection of a Live Tissue Culture Vaccine Against Distemper and Canine Viral Hepatitis."
Ackerman, J. Small Amin. Pract. 6:171784 (1965) "Comparative Experimental Studies on Vaccines Against Distemper and Canine Viral Hepatitis."
Fastier et al., New Zeal. Vet. J. 12: 89–91 (1964), "An Adjuvant Vaccine Against Infectious Canine Hepatitis."
Keeble et al., Vet. Rec. 73: 286–289 (1961), "Immunization Against Canine Virus Hepatitis Using an Inactivated Vaccine."
Zuschek et al., Cornell Vet. 51: 68–76 (1961), "Non-Interference With Immunity by a Trivalent Vaccine Containing Distemper Virus, Infectious Canine Hepatitis Virus and Lutospira Canicola."

*Primary Examiner*—Shep K. Rose
*Attorney, Agent, or Firm*—Curtis, Morris & Safford

[57] ABSTRACT

An improved adjuvant-free intravenously-tolerated vaccine against distemper and *Hepatitis contagiosa canis* consisting of an attenuated distemper virus and an inactivated, concentrated, ultrafiltered, cell-free *Hepatitis contagiosa canis* virus. Methods of making said vaccine and immunizing dogs therewith.

2 Claims, 1 Drawing Figure
:::

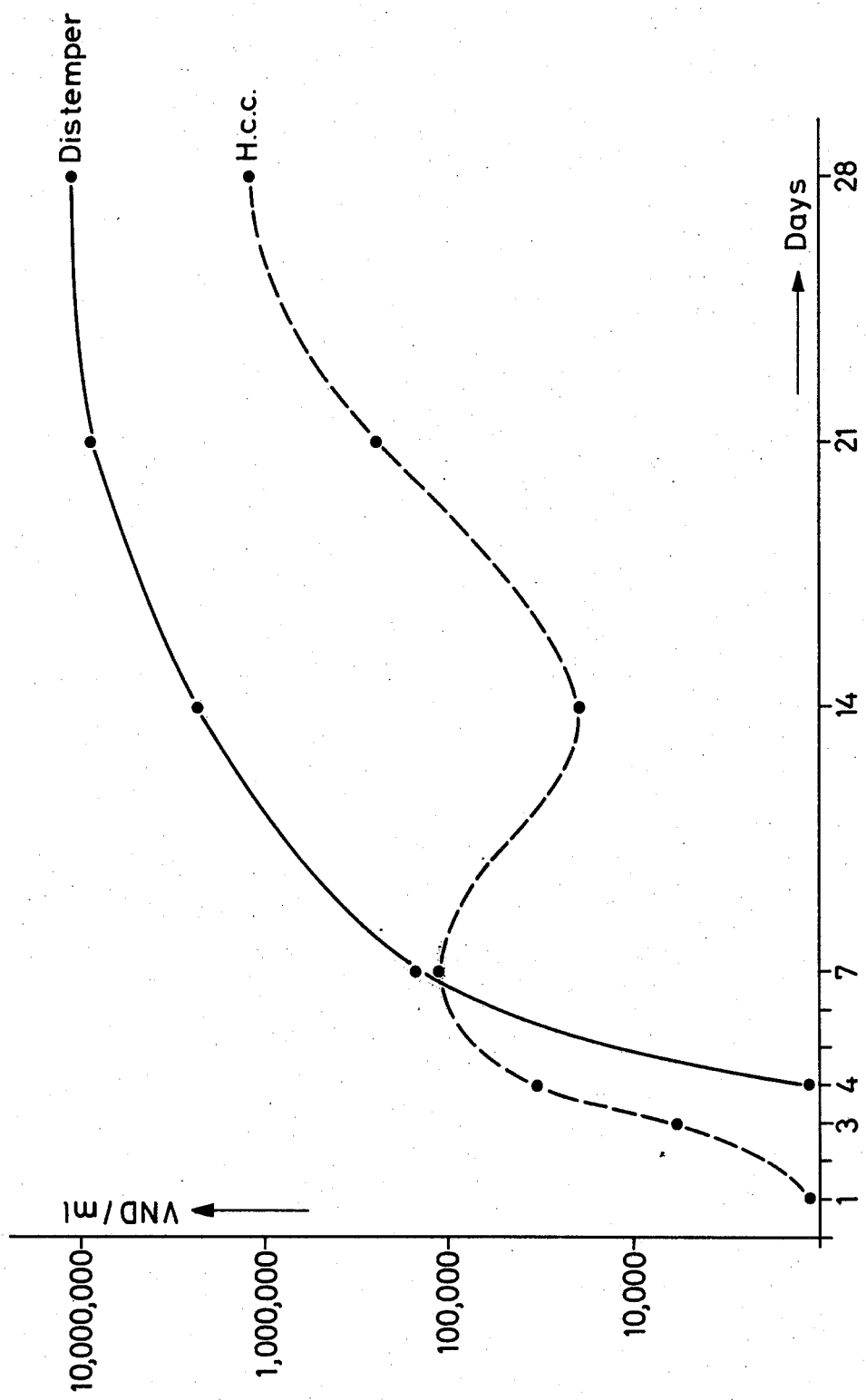

INTRAVENOUSLY TOLERATED ANTI-DISTEMPER AND ANTI-HEPATITIS VACCINE, ITS PREPARATION AND ITS USE FOR IMMUNIZATION

The present invention relates to an intravenously tolerated vaccine against distemper and *Hepatitis contagiosa canis*, its preparation and its use for the immunization of dogs.

For dogs, distemper is a wide-spread dangerous and feverish infectious disease caused by germs which belong to the group of myxo-viruses. Depending on its course, distemper causes catarrhal, respiratory, pulmonary, intestinal or nervous disorders. Young dogs and unprotected older animals are particularly exposed to the risk of infection if they are brought into contact with sick or infected dogs, for example in animal dealers's shops, in shops of zoos, in clinics, etc.

In the same manner as distemper, the hepatitis of dogs, also called Hepatitis contagiosa canis (H.c.c.), is a wide-spread viral disease causing inflammation of the liver and formation of edemas and which is in most cases lethal for young dogs.

Effective combination vaccines against distemper and hepatitis which also have well proved in practice are already known. However, since they contain adjuvants such as aluminum hydroxide or aluminum phosphate, they can be administered subcutaneously only. Upon subcutaneous vaccination, active immunity is in general fully developed after about 14 days after the administration of the vaccine.

Because the risks and possibilities of infections are steadily growing by contacts which are due to the increased trade in dogs by dealers, by the transportation of dogs, by zoo shops, exhibitions and clinics, the normal vaccination, which provides sufficient protection after about 14 days only, does not at all offer security against an infection at the time of the vaccination or a short time thereafter.

Hence, a vaccine was urgently needed with secured protection against infections at an earlier time, as soon as possible after its administration.

Now, the present invention provides an intravenously tolerated vaccine against distemper and Hepatitis contagiosa canis which contains attenuated distemper viruses and inactivated Hepatitis contagiosa canis viruses and which is characterized by being free from adjuvants. Furthermore, the invention relates to the preparation of such an intravenously tolerated combination vaccine against distemper and Hepatitis contagiosa canis and to its use for the immunization of dogs.

With the combination vaccine of the invention, immediate protection against these two diseases is obtained. After a short time, this immediately onsetting protective effect turns into a permanent active immunity. Three days after the intravenous administration, H.c.c.-antibodies can already be detected. Active immunization against distemper is developed during the same time without being influenced by the processes which are induced by the inactivated H.c.c.-viruses.

It has been found that viruses of high purity have an interfering action on and block the cells that are susceptible to infections by pathogenic viruses. High purity viruses of this kind which are especially suitable in this respect and which are well tolerated when injected intravenously are obtained by cultivation in homologous tissue cultures.

Distemper viruses and H.c.c.-viruses are cultivated in known manner on homologous tissues, for example according to the processes described in German Pat. Specification No. 1,138,888 or by DULBECCO and VOGT, J. Exp. Med. 99, 167 (1954). The distemper viruses so obtained are then combined with inactivated hepatitis viruses, using the method described, for example in German Pat. Specification No. 1,076,892. In order to increase the virus concentration, the virus suspension can be concentrated by ultrafiltration and freed from cells by filtration.

The following Example illustrates the invention:

EXAMPLE

The renal cortex was isolated from a fresh dog's kidney under as sterile conditions as possible. The cortex was placed in a Petri dish and comminuted to small pieces having a size of 4 to 5 mm. These small tissue pieces were washed with a phosphate buffer solution (pH 7.5) according to R. Dulbecco and M. Vogt [J. of Exp. Med. 99, 167 (1954)]. The pieces of renal cortex were then trypsinized with a 0.25 % trypsin solution at 37° C on a water bath. Some cells were separated by the trypsinization from the organ pieces. The deposit of these separated cells was isolated and the trypsinization was interrupted by undercooling the whole in a bath of ice-water. The blood particles contained in the trypsin solution and in the deposit were removed by centrifugation at first at 1,000 rev./min. and, after washing twice with a phosphate buffer solution (pH 7.5), at 600 rev./min. 2 ml of washed kidney cells were then suspended in a mixture of 900 ml of culture medium consisting of Eagle's solution containing 0.5 % of lactalbumin hydrolysate and 100 ml of calf serum. 100 ml of this cell suspension were combined with a mixture of antibiotics consisting of 20,000 I.U. of penicillin, 20,000 γ streptomycin and 20,000 γ of neomycin and the pH-value was adjusted to 6.8 by means of a 2.8 % sodium bicarbonate solution which additionally contained 0.002 % of phenol red. This cell suspension was introduced into sterile culture vessels, for example Fernbach flasks, Erlenmeyer flasks or test tubes, up to 8 % of thier capacity. The kidney cells growing to an epithelial layer had to be fed about 4 to 6 days after their introduction by replacing the nutrient solution and, if necessary, the pH-value had to be re-adjusted with a sodium bicarbonate solution in the following days. As soon as the upper cell layer was fully developed, it was inoculated with a suspension which contained H.c.c.-virus that had been cultivated from a dog's liver and adapted to the tissue culture by several passages. This was done by removing the consumed nutrient solution and replacing it by a fresh one to which a H.c.c.-virus suspension had been added at a ratio of 1 : 100. The culture medium consisted of 750 ml of Hank's solution, 250 ml of medium 199 according to J. F. Morton and R. C. Parker [Proc. Soc. Exp. Biol. Med. 73, 1 (1950)] and of an addition of bicarbonate, phenol red and antibiotics as indicated above. The H.c.c.-virus was harvested after about 6 to 7 days by decantation of the cell suspension when a full cytopathogenic effect had developed and the killed epithelial cells were separated. The H.c.c.-virus titer or the antigenicity of the suspension was tested by inoculation of culture tubes with different dilutions (virus titration) or by the complement fixation reaction (CFR).

The H.c.c.-virus isolated from the tissue culture showed a virus titer of $10^{8.5}$ $ID_{50}$/ml or an antigen titer measured by the CFR of 1:40. For preparing the vaccine of the invention, the H.c.c.-virus suspension was concentrated with the aid of a cycling ultra-filter and cooling with ice to a four-fold concentration, so that a CFR-titer of the concentrate of 1:160 was obtained. The H.c.c.-virus suspension obtained from the tissue culture and concentrated by ultrafiltration was combined with 0.1 to 0.2% of a 35% formaldehyde solution and inactivated for 1 week at room temperature. The free formaldehyde of the H.c.c.-vaccine was then determined according to Tannenbaum and bound chemically by the addition of a 1.5 to 2-fold stoichiometric quantity of sodium bisulfite. The H.c.c.-vaccine portion so prepared was combined with the distemper virus portion, which contained live attenuated distemper virus and had been prepared according to the method described in German Pat. Specification 1,138,185 (of U.S. Pat. No. 2,965,544), in the liquid phase and while cooling with ice, filled into bottles having a capacity of 2 ml and freeze-dried.

Test for the Tolerance on Dogs

The vaccine prepared according to the invention was tested in animal tests for its tolerance and efficacy. A total of 150 dogs of various races were given injections of the vaccine into the Vena sapheny, brachiocephalica or jugularis. No reactions such as disorders of the blood circulation, shock reactions or allergies were observed either during the injections or immediately thereafter or later on. The efficacy of the vaccine prepared according to the invention was tested on dogs and guinea pigs.

Test on Guinea Pigs

According to Salenstedt, the guinea pig is a suitable test animal for the test of H.c.c.-antigens. Three groups each of five guinea pigs were vaccinated, for comparative purposes, with three different distemper-hepatitis vaccines. Thus, an antidistemper-antihepatitis vaccine containing aluminum hydroxide (vaccine No. 1), a test vaccine having a similar antigen titer as vaccine No. 1 but no $Al(OH)_3$ (vaccine No. 2) and the vaccine of the present invention (vaccine No. 3) were used. Four weeks after the vaccination, blood was taken from the guinea pigs and mixtures of serum from each group were tested by the neutralization test in a tissue culture for the presence of H.c.c.-antibodies. The determinations of the antibodies were carried out according to known methods [cf. Ackermann, O.: Comparative Experimental Studies on Vaccines against Distemper and Canine Viral Hepatitis. Small Anim. Pract. 6, 171 (1965)] and yielded the values indicated in Table 1.

TABLE 1

Serological test for the efficacy of various vaccines against distemper and canine hepatitis

| Group of guinea pigs | Vaccines used and method of administration | H.c.c.-antibody titer VND/ml |
|---|---|---|
| I | 0.5 ml of vaccine No. 1 subcutaneous | 179,000 |
| II | 0.5 ml of vaccine No. 2 without $Al(OH)_3$ intravenous | 29,000 |
| III | 0.5 ml of vaccine No. 3 intravenous | 619,000 |

VND/ml = virus neutralizing doses per ml of serum

These results show that the increased H.c.c.—antigen content of the vaccine of the invention does not require the addition of aluminum hydroxide and leads to a good development of antibodies against H.c.c. in guinea pigs.

Test for the Efficacy in Dogs

In order to test the reliability and the rapid onset of the protective action of the vaccine of the invention (vaccine No. 3), against H.c.c., a test was carried out with 20 H.c.c.-susceptible whelps which were 7 to 10 weeks old. The whelps were divided into five groups each comprising four animals. In accordance with this division, the vaccine of the invention (vaccine No. 3) was administered intravenously to the individual groups of dogs three, two and one day, respectively before and simultaneously with the infection with pathogenic H.c.c.-virus. The fifth group was used as control group. The infection was effected with all dogs, including the control animals, by oral administration of an infectious H.c.c.—virus extract. This mode of infection was used in order to imitate natural conditions. The result of this challenge infection was surveyed daily by two to three temperature measurements and clinical examinations. The dogs vaccinated and infected at the same time and a part of the animals vaccinated 1 to 2 days before the infection showed a short-duration fever reaction. Other clinical symptoms could not be detected with the vaccinated animals. On the other hand, the control dogs presented distinct symptoms of the disease such as loss of appetite, fatigue, depression and fever lasting for several days. Particulars of this test and the results are indicated in Table 2.

In another test on dogs, we examined the antibody development after intravenous administration of the vaccine of the invention (vaccine No. 3). In this test, eight out of 11 whelps from three broods were vaccinated and three were left as control animals. Blood samples were taken from the dogs, which had an age of 10 and 11 weeks, before the vaccination, on the second, third, fourth, seventh and 14th day after the intravenous administration of the vaccine of the invention (vaccine No. 3) as well as 1 and 2 weeks after a secondary vaccination with a commercial anti-distemper/anti-H.c.c.-vaccine carried out 14 days after the vaccination. The serum isolated from the samples was then tested for the presence of distemper and H.c.c. antibodies [according to Ackermann, O.: Comparative Experimental Studies on Vaccines against Distemper and Canine Viral Hepatitis, Small Anim. pract. 6, 171 (1965)]. The result of the H.c.c.-antibody development is shown in Table 3 and that of the distemper-antibody developmention in Table 4. For a clearer survey, the results of both tables are illustrated by the annexed graph using average values of the results. For the illustration of the H.c.c.-antibody development only these whelps were taken into consideration which were susceptible to H.c.c. at the time of the intravenous vaccination or which had no maternal antibodies.

The following conclusions can be drawn from the test results:

Whereas after the conventional subcutaneous administration of vaccines antibodies can be detected after one week at the earliest, humoral H.c.c.-antibodies can surprisingly be detected already after 3 days after administration of the vaccine of the invention. Normally, H.c.c. has an incubation time of 3 to 6 days. When the infection and the intravenous vaccination are taking place simultaneously, humoral H.c.c.-antibodies are already present before the first symptoms of the disease appear, so that a further proliferation of pathogenic H.c.c.-virus and therewith the manifestation of the disease is stopped. Consequently, the H.c.c.-infection is extinguished from the beginning and does not appear clinically. If the vaccination is carried out at an earlier date than the infection, this immunization mechanism is still more effective; in such cases also ephemeral fever reactions did not occur which are normally the sign of a viremia. If a good maternal antibody titer is still present at the time of the intravenous vaccination (cf. dogs Nos. 3,288 to 3,291, Table 3), active protection is developed by the use of an inactivated H.c.c.-antigen which is further strengthened by a secondary vaccination. Without vaccination, the maternal antibody is reduced, as is shown by the not vaccinated control dog No. 3,291. As regards the rapid activity against distemper, thorough investigations have already been carried out with the live distemper antigen contained in vaccine No. 3 [Ackermann, O. (1969)), Die blauen Hefte fuer den Tierarzt 40, 5 (1969)], which proved the efficacy of this antigen.

The vaccine of the present invention (vaccine No. 3) represents a vaccine which can be administered intravenously owing to its composition and which is indicated above all when there are increased risks of an infection. When administered intravenously, it gives dogs an immediately onsetting protection against distemper and H.c.c. which is due to an interference or blockade of the cells connected with rapid formation of antibodies and passes into a permanent active immunity.

TABLE 2

Clinical test of the protective action of the anti-distemper-H.c.c.-vaccine No. 3 after intravenous administration.

| Dogs No. | H.c.c. anti-bodies before vaccination | Time of vaccination with anti-distemper-H.c.c. vaccine No. 3 | Challenge infecton | Result of the challenge infection |
|---|---|---|---|---|
| 2430 | none | 3 days | | no findings— |
| 2443 | " | before | | no findings— |
| 2457 | " | infection | | no findings— |
| 2466 | " | | | no findings— |
| 2431 | none | 2 days | | no findings— |
| 2444 | " | before | | no findings— |
| 2458 | " | infection | 2 ml of | no findings ⋏- |
| 2467 | " | | pathogenic | no findings ⋏ |
| 2432 | none | 1 day | H.c.c.-virus | no findings ⋏ |
| 2445 | " | before | per orally | no findings ⋏ |
| 2459 | " | infection | | no findings ⋏ |
| 2468 | " | | | no findings ⋏ |
| 2433 | none | simultan- | | no findings ⋏ |
| 2446 | " | eously | | no findings ⋏ |
| 2460 | " | with | | no findings ⋏ |
| 2469 | " | infection | | no findings ⋏ |
| 2539 | none | infection | | a ⋎⋎⋎ |
| 2525 | " | controls | | a ⋎⋎⋎ |
| 2526 | " | | | a ⋎⋎⋎ |
| 2532 | " | | | a ⋎⋎⋎ | a = affected by H.c.c.
⋏ = ephemeral fever
— = normal temperature course
⋎⋎⋎ = protracted fever

TABLE 3

Development of H.c.c.-antibodies after intravenous administration of the anti-distemper-H.c.c.-vaccine No. 3

| Dogs No. | H.c.c.-VND before vaccination | 1st vacc. | H.c.c.-antibody -VND/ml | | | | | 2nd vacc. | H.c.c.-antibody VND/ml | |
|---|---|---|---|---|---|---|---|---|---|---|
| | | | 2 d.a.v. | 3 d.a.v. | 4 d.a.v. | 7 d.a.v. | 14 d.a.v. | | 1 w. after 2nd vacc. | 2 w. after 2nd vacc. |
| 3233 | 0 | | 0 | 13,000 | 29,000 | 100,000 | 62,000 | | 178,000 | 100,000 |
| 3234 | 0 | | 0 | 3,000 | 29,000 | 133,000 | 29,000 | | 29,000 | 62,000 |
| 3235 | 0 | | 0 | 10,000 | 62,000 | 287,000 | 29,000 | | 287,000 | 6,186,000 |
| 3255 | 0 | | 0 | 10,000 | 62,000 | 133,000 | 29,000 | Candur | 1,334,000 | 1,780,000 |
| 3256 | 0 | Anti-dis- | 0 | 3,000 | 62,000 | 13,000 | 13,000 | SH | 133,000 | 288,000 |
| 3288 | 215,000 | temper/ | 161,000 | 100,000 | 29,000 | 62,000 | 13,000 | | 287,000 | 62,000 |
| 3239 | 100,000 | H.c.c. | 22,000 | 18,000 | 62,000 | 62,000 | 13,000 | s.c. | 62,000 | 133,000 |
| 3290 | 215,000 | vaccine No. 3, intravenous | 100,000 | 100,000 | 62,000 | 62,000 | 13,000 | | 62,000 | 133,000 |
| 3236 | 0 | controls | 0 | 0 | 0 | 0 | 0 | | 0 | 0 |
| 3257 | 0 | | 0 | 0 | 0 | 0 | 0 | | 0 | 0 |
| 3291 | 133,000 | | 161,000 | 100,000 | 62,000 | 22,000 | 0 | | 0 | 0 | d.a.v. = days after 1st vaccination
H.c.c.-VND = H.c.c.-virus-neutralizing doses per ml of serum
w. after = weeks after 2nd vaccination

TABLE 4

Development of distemper antibodies after intravenous administration of the anti-distemper/H.c.c. vaccine No. 3.

| Dogs No. | Distemper VND before vaccination | 1st vaccination | Distemper antibody-VND/ml | | | | | 2nd vaccination | Distemper-antibody VND/ml | |
|---|---|---|---|---|---|---|---|---|---|---|
| | | | 2 d.a.v. | 3 d.a.v. | 4 d.a.v. | 7 d.a.v. | 14 d.a.v. | | 1 week after 2nd vaccination | 2 weeks after 2nd vaccination |
| 3233 | 0 | Anti- | 0 | 0 | 0 | 62.000 | 3.500.000 | | 7.500.000 | >10.000.000 |
| 3234 | 0 | dis- | 0 | 0 | 0 | 216.000 | 1.000.000 | | >10.000.000 | >10.000.000 |
| 3235 | 0 | tem- | 0 | 0 | 0 | 62.000 | 3.500.000 | Candur | >10.000.000 | >10.000.000 |
| 3255 | 0 | per/ | 0 | 0 | 0 | 350.000 | 6.100.000 | SH | >10.000.000 | 10.000.000 |
| 3256 | 0 | H.c.c. | 0 | 0 | 0 | 100.000 | 10.000.000 | s.c. | >10.000.000 | 10.000.000 |
| 3288 | 0 | vac- | 0 | 0 | 1.000 | 46.000 | 1.000.000 | | 7.500.000 | 10.000.000 |
| 3289 | 0 | cine | 0 | 0 | 600 | 215.000 | 4.600.000 | | >10.000.000 | >10.000.000 |
| 3290 | 0 | No. 3 | 0 | 0 | 0 | 46.000 | 350.000 | | 7.500.000 | >10.000.000 |
| 3236 | 0 | con- | 0 | 0 | 0 | 0 | 0 | | 0 | 0 |
| 3257 | 0 | trols | 0 | 0 | 0 | 0 | 0 | | 0 | 0 |
| 3291 | 0 | | 0 | 0 | 0 | 0 | 0 | | 0 | 0 |

For the definition of abbreviations see Table 3.

We claim:

1. In an adjuvant-free intravenously-tolerated vaccine against distemper and *Hepatitis contagiosa canis*, the improvement wherein said vaccine consists essentially of an attenuated distemper virus and a formaldehyde-inactivated, concentrated, ultra-filtered, cell-free *Hepatitis contagiosa canis* virus having a virus titer of $10^{8.5}$ $ID_{50}$/ml and a complement fixation antigen titer of at least 1:160 in the concentrate versus 1:40 in the pre-concentrate.

2. In the method of immunizing dogs against distemper and *Hepatitis contagiosa canis*, the improvement which comprises intravenously administering the vaccine of claim 1.

* * * * *